United States Patent

[11] 3,607,842

| [72] | Inventors | Chester L. Parris<br>Morris Plains;<br>Leo S. Rieve, Schooleys Mountain, both of N.J. |
|---|---|---|
| [21] | Appl. No. | 843,187 |
| [22] | Filed | July 18, 1969 |
| [45] | Patented | Sept. 21, 1971 |
| [73] | Assignee | Allied Chemical Corporation<br>New York, N.Y. |

[54] COPOLYMERS OF A CONJUGATED DIENE AND MALEIC ANHYDRIDE
9 Claims, No Drawings

[52] U.S. Cl.......................................................... 260/78.5 R,
260/82.3
[51] Int. Cl......................................................C08f 17/00,
C08f 1/28
[50] Field of Search............................................ 260/78.5
BU, 82.3, 82.5

[56] References Cited
UNITED STATES PATENTS

| 3,491,068 | 1/1970 | Gaylord......................... | 260/78.5 |
| 2,967,174 | 1/1961 | Bartl............................. | 260/78.5 |
| 3,070,587 | 12/1962 | Zelinski........................ | 260/94.3 |
| 3,203,945 | 8/1965 | Zelinski........................ | 260/94.3 |
| 3,215,682 | 11/1965 | Farrar et al. .................. | 260/94.3 |
| 3,400,113 | 9/1968 | Winter et al. ................. | 260/94.3 |
| 3,483,174 | 12/1969 | Libengood et al............ | 260/83.5 |

*Primary Examiner*—Joseph L. Schofer
*Assistant Examiner*—John Kight
*Attorneys*—Arthur J. Plantamura and Stanley M. Teigland

ABSTRACT: Substantially equimolar copolymers of a conjugated diene, such as butadiene, and a comonomer which is maleic anhydride or acrylonitrile can be prepared by copolymerizing the conjugated diene and the comonomer in an inert organic solvent in the presence of a Ziegler-type catalyst. The reaction proceeds rapidly at room temperature to yield a copolymer which is useful to form shaped articles.

COPOLYMERS OF A CONJUGATED DIENE AND MALEIC ANHYDRIDE

BACKGROUND OF THE INVENTION

This invention relates to the preparation of a substantially equimolar copolymer of a conjugated diene and maleic anhydride or acrylonitrile.

When a conjugated diene and an ethylenically unsaturated polar monomer are heated together they react to form the corresponding cyclic adduct. This reaction is commonly referred to as the Diels-Alder reaction. The classical example of the Diels-Alder reaction is the reaction between butadiene and maleic anhydride to form tetrahydrophthalic anhydride according to the following equation:

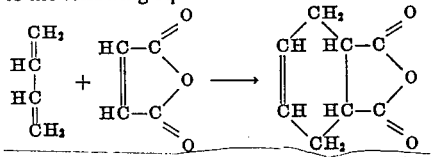

The reaction is normally carried out at moderately elevated temperatures and requires about a day to complete. The product, tetrahydrophthalic anhydride, is not known to homopolymerize.

U.S. Pat. No. 3,081,283 teaches that butadiene and maleic anhydride can be copolymerized in the presence of a peroxy catalyst to yield a low molecular weight, i.e., essentially liquid, polymer wherein maleic anhydride constitutes, at most, about 2 percent of the polymer structure. Like the Diels-Alder synthesis, the reaction is carried out at moderately elevated temperatures and proceeds very slowly, requiring up to 18 hours to complete.

It is an object of the present invention to prepare a solid copolymer of a conjugated diene, such as butadiene, and maleic anhydride or acrylonitrile. It is a further object of this invention to prepare such a copolymer by a process which is rapid and which may be carried out at temperatures and pressures approximating room temperature and atmospheric pressure.

SUMMARY OF THE INVENTION

We have found, surprisingly, that a conjugated diene and a comonomer selected from the group consisting of maleic anhydride or acrylonitrile can be copolymerized in substantially equimolar proportions to yield a solid polymer from which shaped articles can be prepared. The polymer is obtained by copolymerizing a conjugated diene and maleic anhydride or acrylonitrile in an inert organic liquid solvent in the presence of a catalytic amount of a Ziegler-type catalyst.

The term "Ziegler-type catalyst" is well known in the art and refers to the two component polymerization catalyst system consisting of (a) an organometallic compound wherein the metal is selected from groups I through III of the periodic table, and (b) a compound of a transition metal of groups IV through VIII of the periodic table.

The conjugated dienes which can be employed to form a substantially equimolar copolymer in accordance with this invention include dienes having the formula

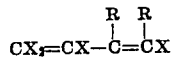

wherein each X is independently hydrogen or halogen and each R is independently hydrogen, halogen, lower alkyl or phenyl. The halogen is preferably chlorine. Examples are isoprene, piperylene, chloroprene, phenyl butadiene and the like.

The copolymerization can be carried out under a wide variety of conditions. The reaction proceeds spontaneously and rapidly at room temperature and atmospheric pressure. The reaction can also be carried out at subatmospheric pressure or at elevated pressures, such as pressures developed autogeneously under sealed bomb conditions. The temperature of the reaction can likewise vary between wide limits. We have found that at temperatures at which the Diels-Alder adduct is normally obtained, i.e., from about 50° to 100° C., we obtain the copolymer of this invention. However, it is not necessary to use elevated temperatures. In order to maintain the pressure of the system at a convenient level, it is desirable to carry out the reaction at room temperature or below. Temperatures ranging from the boiling point of the conjugated diene to room temperature are particularly suitable. Lower temperatures can be used if desired.

Polymerizatiion is preferably effected in the absence of oxygen and moisture, which tend to inhibit the reaction. Oxygen can readily be excluded by purging the reaction vessel with nitrogen or other inert gas or butadiene prior to adding the butadiene.

The reactants polymerize in substantially equimolar proportions; however, an excess of either reactant can be added to the reaction vessel if desired. The reaction is normally complete in less than 2 hours. On completion, the copolymer can be recovered from the polymerization liquor in any suitable manner, such as by filtration or centrifugation followed by washing, such as with methanol.

In a typical polymerization, maleic anhydride or acrylonitrile in solution and the transition metal compound of the catalyst system are charged to the reaction vessel. A conjugated diene is then added, either as a liquid or as a gas under pressure. The reaction is initiated by the addition of the second component of the catalyst system, i.e., the organometallic compound. This particular order of addition is not essential to effect polymerization, but is especially preferred because we have found that combining the two components of the catalyst before both reactants are present tends to inhibit the polymerization reaction.

The copolymer of butadiene and maleic anhydride prepared in accordance with this invention is a white, free flowing amorphous powder which softens without melting at about 70° C. The glass transition temperature is about 60° C. The copolymer is thermoplastic but cross-links at elevated temperatures. It can be compression molded to form shaped articles, which can be cross linked in the mold if desired. The cross-linked material is infusible and remains stable up to about 390° C., at which temperature it begins to decompose. If acrylonitrile is used as the comonomer, a yellowish elastomer is obtained.

DESCRIPTION OF THE PREFERRED EMBODIMENTS

Although the term "Ziegler-type catalyst" is understood to include the compounds previously referred to herein, certain of these compounds are more effective in this invention than others. The more effective compounds include, for the organometallic compound, lower alkyls, lower alkyl hydrides and lower alkyl halides of aluminum, beryllium, lithium, and zinc; and for the transition metal compound, organic complexes of the metals selected from the first transition series, i.e., elements 19 through 28. Of these more effective compounds, particularly good results are obtained using aluminum lower alkyls, such as triisobutyl aluminum, and organic complexes of cobalt, iron or nickel, e.g. iron acetylacetonate, cobalt bis(ethylacetoacetate), and cobalt bis(salicylaldehyde).

The mol ratio of organometallic compound to transition metal should range from 1:1 to 10:1 for preferred results. A ratio of 3:1 is especially preferred.

The concentration of the catalyst system is normally expressed in terms of the mol ratio of transition metal to total reactants. This ratio is preferably from 0.1:1 to 0.01:1.

The inert organic solvent is preferably nonpolar and includes straight chain or cyclic saturated hydrocarbons, aromatic hydrocarbons, chlorinated hydrocarbons and ethers. Toluene is typical of such solvents and is particularly suitable for use herein.

The following examples further illustrate the invention.

EXAMPLE 1

100 grams maleic anhydride and 12.5 grams cobalt (III) acetylacetonate, each dissolved in 600 ml. toluene, were charged to an autoclave. After the autoclave was purged with nitrogen and cooled to 10° C., 26.5 ml. of triisobutylaluminum were added. With the temperature of the autoclave at 10° to 15° C., 180 ml. of butadiene were transferred thereto. The reaction mixture was stirred for two hours, after which the unreacted butadiene was flushed from the system and 10 ml. of methanol acidified with HCL were added to the mixture. The product was transferred to a 4-liter beaker which was filled with acetone. A 400 ml. aliquot of the highly swollen suspension was treated with methanol whereupon the polymer coagulated. The polymer was worked up with additional methanol in a Waring Blender, filtered and air dried.

Analysis: Calculated for an equimolar copolymer of butadiene and maleic anhydride: C, 63.0; H, 5.27; saponification equivalent, 156.1. Found: C, 63.54; H, 5.46. 5.52; saponification equivalent, 156.9.

After filtration and drying the total yield of polymer from the whole batch was 134.8 grams (88 percent). The infrared spectrum of the product had no absorption bands at frequencies which indicate the presence of carbon-carbon double bonds.

EXAMPLE 2

A 6 ounce pressure bottle equipped with a magnetic stirring bar was charged with 1.25 grams (0.0035 mol) cobalt (III) acetylacetonate, 10 grams (0.1 mol) maleic anhydride and 50 ml. toluene. After the bottle was flushed with butadiene, it was cooled to −10° C. and 1.70 grams (0.0105 mol) triisobutylaluminum were added. The bottle was then pressurized with butadiene at 10-18 p.s.i.g. As the reaction proceeded, heat was evolved, the temperature rose to 25° C., the viscosity increased and the color slowly turned to reddish brown. When agitation became difficult, the butadiene feed was discontinued. The product was worked up with methanol in a Waring Blender, filtered, washed with additional methanol and allowed to dry. The copolymer yield was 14.8 grams (96 percent).

EXAMPLE 3

100 grams of maleic anhydride and 12.5 grams cobalt (III) acetylacetonate, each dissolved in 500 ml dry toluene, were charged to an autoclave. After the autoclave had been purged with nitrogen and cooled to 12° C., 10 ml. of dry isoprene liquid were added via a charging device. With agitation and cooling of the mixture at 10°-15°, a solution of 0.105 mol. of triisobutylaluminum in 50 ml. toluene was added. After 30 minutes, 190 ml. cold isoprene was incrementally added over a period of about 0.5 hr. and the mixture was stirred 4.5 hours longer. 10 ml. of methanol were added and the autoclave was vented. The contents were diluted to a volume of about 4 liters with acidified acetone. The swollen polymer was coagulated by the addition of water and the slightly rubbery material was filtered. The product was washed repeatedly with methanol in a Waring Blender. After filtration and air drying, there was obtained 114 grams (70 percent of sandy, granular copolymer.

EXAMPLE 4

Following the procedure of example 3, there was obtained from 1 mol of maleic anhydride, 2 mols of piperylene, 0.0117 mol cobalt (III) acetylacetonate and 0.03 mol triisobutylaluminum in toluene, 52.6 grams of the 1:1 copolymer of maleic anhydride and piperylene.

EXAMPLE 5

Solutions of 100 grams maleic anhydride and 4.14 grams iron (III) acetylacetonate, each in 500 ml. toluene, were charged to an autoclave which was cooled to 10° C. and thoroughly purged with nitrogen. A solution of 0.035 of triisobutylaluminum in toluene was added via a charging device and then 2 of liquid butadiene were incrementally added over a 20-30 minute period. The mixture was stirred for 16 hours then 10 ml. of methanol were added. The autoclave contents were transferred to a large beaker and allowed to settle. The supernatant liquid was decanted and discarded and the precipitate was agitated vigorously with one liter of fresh toluene in which a little hydrogen chloride was dissolved. The liquid was discarded and the procedure repeated 3 times until the color of the toluene layer was light yellow. Finally the product was washed in a blender with excess isopropyl alcohol. After filtration and drying the yield was 136.5 grams of 1:1 copolymer.

EXAMPLE 6

The procedure of example 2 was followed except 0.0105 mol diethylaluminum chloride was employed in place of the triisobutylaluminum. The yield was 10.7 grams (70 percent of copolymer.

EXAMPLE 7

The procedure of example 2 was followed except 0.0105 mol ethylaluminum sesquichloride was employed in place of the triisobutylaluminum. The yield was 11.3 grams (73 percent) of copolymer.

EXAMPLE 8

A clean, dry, nitrogen-purged pressure bottle equipped with a magnetic stirring bar was charged with 0.435 mol liquid butadiene, 0.35 mol acrylonitrile, and 50 ml. tetrachloroethylene. A toluene solution of 0.0105 mol diethylaluminum-chloride was mixed with 0.0105 mol acrylonitrile and, after several hours, the yellow complex was added to the monomer mixture at −30° C. A toluene solution of 0.0007 mol cobalt tris(acetylacetonate) was then added. The temperature was allowed to rise slowly to 0° C. and, after 10 hours at 0°-5° C. was allowed to rise to room temperature. Excess monomer was vented and the reaction product treated with acidified methanol. After repeated washing with solvent there was obtained 7.3 grams of a tough, yellowish elastomer which was identified as a 1:1 copolymer of butadiene and acrylonitrile.

Analysis: Calculated for $C_7H_9N$: C, 78.50; H, 8.41; N, 13.08. Found: C, 79.08; H, 8.00; N, 12.97.

We claim:

1. A process for preparing a copolymer of a conjugated diene and maleic anhydride, which process comprises copolymerizing the diene and maleic anhydride in an inert organic solvent in the presence of a two component catalyst system wherein one component is an organometallic compound wherein the metal is selected from groups I through III of the periodic table and other component is a compound of a transition metal selected from groups IV through VIII of the periodic table.

2. The process of claim 1 wherein the organometallic compound is aluminum, beryllium, lithium or zinc lower alkyl, lower alkyl hydride or lower alkyl halide and the compound of the transition metal is an organic complex of a metal selected from the first transition series.

3. The process of claim 2 wherein the organometallic compound is aluminum tri(lower alkyl) or aluminum lower alkyl halide and the compound of the transition metal is an organic complex of cobalt, iron or nickel.

4. The process of claim 3 wherein the mol ratio of transition metal to conjugated diene and comonomer ranges from 0.0:1 to 0.01:1.

5. The process of claim 4 wherein the mol ratio of organometallic compound to transition metal ranges from 1:1 to 10:1.

6. The process of claim 5 wherein the conjugated diene is butadiene, piperylene, or isoprene.

7. A moldable copolymer consisting essentially of recurring units derived from (A) a conjugated diene having the formula

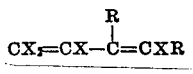

wherein each X independently is hydrogen or halogen and each R independently is hydrogen, halogen, lower alkyl or phenyl and (B) maleic anhydride, the molar ratio of the recurring units derived from (A) and (B) being substantially 1:1, said copolymer having an infrared spectrum having substantially no absorption bands at frequencies which indicate the presence of carbon-carbon double bonds.

8. The copolymer of claim 7 wherein the conjugated diene is butadiene, piperylene, or isoprene.

9. The copolymer of claim 7 wherein the conjugated diene is butadiene.

PO-1050
(5/69)

UNITED STATES PATENT OFFICE
CERTIFICATE OF CORRECTION

Patent No. 3,607,842    Dated September 21, 1971

Inventor(s) L.S. Rieve and C. L. Parris

It is certified that error appears in the above-identified patent and that said Letters Patent are hereby corrected as shown below:

Column 2, line 11, "Polymerizatiion" should be --Polymerization-

Column 3, line 9, "HCL" should be --HCl--.

Column 3, line 17, after "Found:C" --63.47,-- should be inserted

Column 3, line 59, after "(70 percent" --)-- should be inserted.

Column 4, line 18, after "(70 percent" --)-- should be inserted.

Column 4, line 53, after "and" --the-- should be inserted.

Column 4, line 66, "0.0:1" should be --0.1:1--.

Signed and sealed this 21st day of March 1972.

(SEAL)
Attest:

EDWARD M.FLETCHER,JR.
Attesting Officer

ROBERT GOTTSCHALK
Commissioner of Patents